Patented Apr. 20, 1937

UNITED STATES PATENT OFFICE 2,077,485

POLYMERS AND METHOD FOR PREPARING SAME

Walter E. Lawson and James A. Arvin, Wilmington, Del., assignors to E. I. du Pont de Nemours & Company, Wilmington, Del., a corporation of Delaware No Drawing. Application October 14, 1932, Serial No. 637,783

29 Claims. (Cl. 260—2)

This invention relates to the polymerization of vinylacetylene in the presence of other substances, and it pertains more particularly to the polymerization of vinylacetylene in the presence of fatty oils, synthetic resins, natural resins, and other substances which are themselves capable of polymerizing or which will interpolymerize with vinylacetylene.

Vinylacetylene, a hydrocarbon having the structure $CH_2=CH-C\equiv CH$, has been prepared by Willstatter and Wirth (Ber., vol. 46 p. 535 (1913)). It has been prepared according to a different method by Nieuwland (U. S. Patent No. 1,811,959), and by Calcott and Downing (U. S. Patent application Serial No. 303,494, filed January 6, 1928), the polymerization of acetylene being carried out in the presence of a catalyst composed of a cuprous salt, metallic copper, a salt of a tertiary amine or ammonia, and water, and/or suitable acids. Thru the agency of this catalytic medium, acetylene is caused to react with itself to produce a number of polymers, one of which is vinylacetylene. The vinylacetylene may be readily separated and purified by fractional distillation. The polymerization of acetylene polymers by the use of heat, light, oxygen, and oxidizing agents, has been described by Nieuwland (U. S. Patent No. 1,812,541). Collins (U. S. Patent No. 1,812,849) discloses a process for polymerizing acetylene polymers which comprise chiefly divinylacetylene and higher acetylene polymers, to produce materials having the properties of drying oils. Pure vinylacetylene has been polymerized by Carter and Downing (U. S. application Serial No. 503,606, filed December 19, 1930), by heating vinyl acetylene in the presence of suitable catalytic agents, and/or in the presence of solvents.

Vinylacetylene polymers, altho for the most part clear and soluble, are unsuitable in many respects for use in coating compositions. Films formed from these polymers are sensitive to sunlight, discolor quite readily, become brittle and show poor adhesion to smooth surfaces such as metal or glass. These polymers furthermore do not combine readily with most film-forming or related substances, the presence of which substances might have a tendency to overcome the defects in the polymers. Heating results in the decomposition of the polymers, and solutions of the film-forming substances and the polymers when mixed give incompatible films.

This invention has as an object the production of polymerized vinylacetylene compositions which are not subject to the above defects. It has as a more specific object a method for combining vinylacetylene with fatty oils, synthetic resins, natural resins, and their esters, and the like, to yield resin-like products suitable for use as protective coatings. This method in general comprises the carrying out of the polymerization of substantially pure vinylacetylene, i. e., vinylacetylene substantially free from higher acetylene polymers in the presence of materials of the type described to obtain film-forming materials in which the components are compatible with each other, or in which the modifying materials have been interpolymerized with the vinylacetylene. Other objects of the invention will become apparent from the following description of the invention.

The following examples include our preferred forms of the invention, and are not to be construed as limiting the scope of the invention:

(A) *Polymerization of vinylacetylene in the presence of esters of fatty acids*

One of the most useful types of materials for stabilizing and toughening the vinylacetylene polymer are the fatty acid esters, particularly drying oils, such as China-wood oil and other natural vegetable oils, such as castor oil. Example 1 illustrates the polymerization of vinylacetylene in the presence of a natural drying oil, specifically China-wood oil.

Example 1

Twenty-five parts of vinylacetylene, 25 parts of China-wood oil and 50 parts of toluene are heated in a closed vessel of proper strength at 125° C. for 14 hours, in an atmosphere of nitrogen. Suitable precautions should be taken before sealing the apparatus to avoid loss of the volatile vinylacetylene, as by cooling the wood oil, solvent, and the reaction vessel itself to temperatures below 0° C. Upon completion of the heating, the vessel is again cooled before opening. About 44 parts of non-volatile material remains, which indicates 85–90% polymerization. The product is completely homogeneous, both in toluol solution and in films from which the solvent has evaporated. These films dry rapidly to a smooth, hard surface which is tough and does not flake or chip on aging, and does not discolor in sunlight, as do films of the pure vinylacetylene polymer. We believe an interpolymer with the oil is obtained because most of the oil can not be extracted or otherwise removed as such from this product, because pure vinylacetylene polymer can not be combined with China-wood oil by heating, and because homogeneous films can not be obtained by blending solutions of the oil and the pure polymer.

The use of a solvent in carrying out the interpolymerization, while desirable, is not essential. If equal parts of China-wood oil and vinylacetylene are reacted together under the otherwise exact conditions of Example 1, the weight of the non-volatile material obtained indicates only slightly less interpolymerization (80–85%)

and the product shows no radical difference in properties. However, without the solvent present, operation on a large scale is undesirable because of the hazardous nature of the undiluted vinylacetylene.

Instead of drying oils, we may use other fatty oils of the semi-drying or non-drying type, as illustrated in the following example:

Example 2

One part castor oil, three parts of vinylacetylene, and three parts aromatic solvent naphtha[1]

[1] Known commercially as "Hi-flash Naphtha". The term "aromatic solvent naphtha" refers throughout to this material.

are heated together in a closed vessel at 125–130° C. for nine hours in an atmosphere of nitrogen. Unchanged vinylacetylene and one-third to one-half of the solvent are removed from the product by vacuum distillation, the temperature being kept below 100° C. A film flowed from the resulting solution is clear and dry to touch in 20–30 minutes. Films flowed from blended solutions of pure vinylacetylene polymers and castor oil are immediately incompatible, while the above film showed only a faint haze after a month's time.

Other fatty oils which may be substituted for those specifically described in Examples 1 and 2 are linseed oil, coconut oil, soya bean oil, perilla oil, cottonseed oil, other drying, semi-drying, and non-drying oils which are glycerides of fatty acids, and esters of fatty acids with alcohols other than glycerine e. g., sorbitol, diethyleneglycol and pentaerythritol.

(B) Polymers of vinylacetylene with natural resins and modified natural resins Instead of, or in addition to fatty oils, we may polymerize vinylacetylene in the presence of natural resins.

Example 3

Three parts vinyl acetylene, one part run Congo resin, and one part aromatic solvent naphtha are heated together in a closed vessel at 125–130° C. for fourteen hours in an atmosphere of nitrogen. After removal of unchanged vinylacetylene, the percentage of non-volatile material in the solution indicates 75–80% interpolymerization. Films flowed from the above product, diluted to 50% solids with the same solvent, dry very rapidly but are slightly hazy, nevertheless, they show a great improvement over mixtures of vinylacetylene polymer and run Congo, blended by solvents or by heating.

Natural resins which may be used in lieu of Congo resin in Example 3 are rosin, Kauri, Pontianac, etc. or mixtures thereof, either in the natural state or combined with glycerol or other alcohols as simple or complex esters. Frequently, it is advantageous to use acids which have been separated from the natural gums, e. g., abietic acid.

Instead of the natural gums we may use their esters, such as ethyl abietate and the ester gums, with equal or greater facility.

Another related and very useful type of material for interpolymerization with the vinylacetylene are the varnish bases, obtained by heating together the natural gums and fatty oils, particularly drying oils. The blending of various amounts of oil with the natural resin in this way facilitates the formation with vinylacetylene of an interpolymer capable of producing completely clear films.

Proceeding further, we may use varnish bases made by heating the esters of natural acidic gums with drying oils. For example, rosin may be heated with an excess of glycerol in the usual way to form ester gum. Seventeen parts of the ester gum is then blended with 13 parts each of China-wood and linseed oils by heating at 275° C. for 15 minutes. This product is thinned while still hot with 56 parts mineral thinner and one part of 0.75% cobalt linoleate solution. Vinylacetylene may be interpolymerized with the varnish base of this solution by employing the solution as such, as in the following example:

Example 4

| | Parts |
|---|---|
| Above varnish solution | 27.2 |
| Vinylacetylene | 34.8 |
| Aromatic solvent naphtha | 38.0 |
| | 100.0 |

These ingredients are heated together in a closed vessel at 125–130° C. for 14 hours in an atmosphere of nitrogen. Unchanged vinylacetylene is evaporated from the solution so obtained, after which the "solids" content (47.8%) and the remaining weight of material (89.6 parts) shows a yield of non-volatile material which corresponds to over 90% interpolymerization. Solutions of this product dry rapidly to clear, tough films which adhere well to glass and metal.

(C) Polymerization of vinylacetylene with materials which are capable of being polymerized to form resins As a further example of the type of substance with which vinylacetylene can be interpolymerized, it is possible to use organic compounds which in themselves are capable of polymerizing to film-forming materials, as for example styrene or other aromatic vinyl compounds. By the term "film-forming materials" we mean materials which will polymerize, dry or set to form hard, resistant, resinous films. This is illustrated in the following example, in which the ethyl benzene normally associated with the styrene is used. The ethyl benzene acts for the most part as a solvent.

Example 5

Forty parts of a freshly distilled mixture of styrene and ethyl benzene (approximately 22% styrene) and 21 parts of vinylacetylene are heated together in a closed vessel at 125–130° C. for 12 hours. The solution is then distilled in a vacuum until the non-volatile content is about 75%. Films obtained from this solution, diluted to 50% with aromatic solvent naphtha, are hard and tough but bloom slightly on aging for one month. These films are not so resistant to light and discoloration as those of the preceding examples, but nevertheless show a great improvement over conventional combinations; for example, films flowed from blended solutions of styrene and vinylacetylene polymerized separately are immediately incompatible. However, because of this discoloration, interpolymers of vinyl acetylene with aromatic vinyl derivatives such as styrene are not a preferred embodiment of our invention.

Instead of unpolymerized styrene, we may use the polymerized material though it is preferred to polymerize the styrene along with the vinylacetylene as in Example 5, or to interpolymerize the two, because of their chemically related nature. In most other cases of synthetic resins, however, the opposite is true. That is, it is more advantageous to polymerize the vinylacetylene in the presence of the preformed synthetic resin, rather than the ingredients thereof.

An interpolymer of monovinylacetylene and styrene may also be formed by heating monovinylacetylene in the presence of 0.4-50% of acidic material and at a temperature in the neighborhood of 90-115° C. either by a batch or continuous method and in the presence or absence of solvents, polymerization catalysts, and/or antioxidants. The acidic materials may be organic acids, e. g., maleic, acetic, chloroacetic, malonic, benzoic, formic, abietic, phthalic, succinic, propionic, butyric, crotonic, fumaric, salicyclic and their anhydrides, phenols, e. g., phenol and pyrogallol, and inorganic acids, e. g., hydrochloric. The reaction mixture may be distilled to remove unreacted monovinylacetylene. A substantial amount of styrene forms in situ, and may be distilled off from the reaction mixture at reduced pressure. The residue remaining after the removal of the styrene contains a substantial amount of non-benzenoid open-chain monovinylacetylene polymer and an interpolymer of monovinylacetylene and styrene and/or polymerized styrene. Products similar to styrene and monovinylacetylene-styrene interpolymers are obtained under like conditions, where homologues or derivatives of monovinylacetylene are used in place of monovinylacetylene. In accordance with the present invention, however, it is desired that interpolymers of monovinylacetylene and styrene be prepared by reacting monovinylacetylene and preformed styrene, since the polymer thus obtained is far superior to that obtained by the method just described, and its method of preparation is far more economical and efficient.

As examples of materials which like styrene may be polymerized by themselves to form resins or resin-like materials, we may employ vinyl compounds other than styrene, such as vinyl acetate, vinyl chloroacetate, vinyl chloride, vinyl propionate, etc., and related compounds such as 1-4 divinyl benzene, indene, coumarone, and o-hydroxystyrene; also other compounds capable of polymerization to resins, such as ketene, methylglyoxal, ketenephenylimine ($CH_2=CN-C_6H_5$), thiocarbanilide, hydroxystearic acid, acetaldehyde, furfural, cyclohexanone, benzyl chloride, methyl acrylate and the like. Optimum conditions for interpolymerizing many of these compounds with vinylacetylene are variable and somewhat uncertain. In many cases, the improvement in film quality (e. g. with styrene) over the pure vinylacetylene polymer, although usually definite, is not so marked as, for example, when fatty oils, natural resins, and certain synthetic resins (such as those of the phenolaldehyde and polyhydric alcohol-polybasic acid types) are used. For these reasons, interpolymers of vinylacetylene with the latter substances (rather than substances which in themselves polymerize) from the preferred embodiment of this invention.

(D) *Polymerization of vinylacetylene in the presence of synthetic resins*

Synthetic resins may, like the natural resins, be used to modify favorably the properties of vinylacetylene polymers. A preferred type of synthetic resin is the polyhydric alcohol-polybasic acid type. We prefer to employ those resins which have been modified by monovalent ingredients (that is monohydric alcohols and/or monobasic acids, such as fatty oil acids, natural acidic gums, etc.), or by fatty oils or other glycerol esters. A suitable polyhydric alcohol-polybasic acid resin is prepared by heating the following substances for 5 hours at 250° C., or to an acid number of 4-6:

| | Parts |
|---|---|
| Glycerol | 17.2 |
| Phthalic anhydride | 27.0 |
| Linseed oil fatty acids | 55.8 |
| | 100.0 |

Vinylacetylene may be polymerized in the presence of the above resin as follows:

*Example 6*

Two parts of vinylacetylene, four parts of the above resin, and three parts of aromatic solvent naphtha are heated together in a closed vessel at 125-130° C. for 14 hours, in an atmosphere of nitrogen. About 83% of the vinylacetylene remains in the non-volatile portion of the solution. Films of this product are tough, clear, and very durable to weathering. This same polyhydric alcohol-polybasic acid resin could not be blended with polymerized vinylacetylene by heating or by means of solvents.

Other suitable synthetic resins are those of the phenol-formaldehyde type. An example of this type of resin which can be used in this invention is prepared as follows:

| | Parts |
|---|---|
| Parahydroxydiphenyl | 20.2 |
| Formaldehyde solution (37%) | 20.2 |
| Sodium hydroxide solution (2N) | 59.6 |
| | 100.0 |

The above ingredients are stirred together and allowed to stand for 18 hours at room temperature and then heated at 70-80° C. for 6 hours and finally allowed to stand again for 18 hours. The mixture is acidified with 6N hydrochloric acid and washed thoroughly with water. It is then dried at 70-80° C. under diminished pressure.

Vinylacetylene can be polymerized with the above resin as follows:

*Example 7*

Five parts of vinylacetylene, one part of the above resin, and four parts of acetone are heated together in a closed vessel at 125-130° C. for 7 hours, in an atmosphere of nitrogen. The solution so obtained is evaporated under diminished pressure to a non-volatile content of approximately 50%. A film flowed from this solution dries rapidly and forms a clear coating which, however, "blooms" slightly upon aging for several weeks.

Other synthetic resins may be substituted for the synthetic resins referred to in Examples 6 and 7, for example, urea-aldehyde, ketone-aldehyde, amine-aldehyde, hydrocarbon-formaldehyde, aryl sulfamide-aldehyde ("Santolite"), phenolketone, and phenol-terpene types, or mixtures thereof. As examples of polyhydric alcohol-polybasic acid type resins, other than that resin specifically referred to in Example 6 may be cited those modified by one or more of the following materials: (1) fatty oil acids other than linseed oil acids, such as coconut, Chinawood, cottonseed, and soya bean oil acids, (2) natural acidic resins, such as rosin and Congo, (3) other monobasic acids, such as benzoic and butyric acids, (4) monohydric alcohols, such as amyl and cyclohexyl alcohols, and (5) certain esters, such as the fatty acid esters, particularly of glycerol, and esters of the natural acidic gums, such as ester gum and ethyl abietate. In preparing these and other resins any of the methods known to the art are included in the scope of this invention.

Other suitable phenol-aldehyde type resins are those which are obtained by condensing m-cresol and formaldehyde, phenol and furfural, diphenylolpropane and formaldehyde, p-tertiary amyl phenol and formaldehyde, ditolylolpropane and formaldehyde, etc.

(E) *Polymerization of vinylacetylene in the presence of complexes containing more than one member of the group comprising fatty oils, synthetic resins, natural resins, and resin-forming materials*

A still more complex interpolymer can be obtained by polymerizing the vinylacetylene in the presence of more than one member of the group consisting of fatty oils, synthetic resins, natural resins (or their esters), or of resin-forming substances. Where more than one of this group is used, the exact method is capable of wide variation. The vinylacetylene may be polymerized in the presence of mechanical mixtures of the several substances, of heat blended mixtures (such as fused mixtures of two preformed synthetic resins, of a preformed synthetic resin and a natural resin, of a natural or synthetic resin and a fatty oil, etc.; see the fatty oil-ester gum combination of Example 4), or of products formed by reacting simultaneously the reaction components of one of the above group with another member of the group or its reaction components. The latter type of product was illustrated in Example 6 wherein the reaction components of two members of the above mentioned group are reacted simultaneously (glycerol and phthalic anhydride, the reaction components of polyhydric alcohol-polybasic acid resin are reacted with glycerol and linseed oil acids, reaction components of a fatty oil). As an example of a product formed by reacting simultaneously one of the above group with reaction components of another (in the presence of which product vinylacetylene can be polymerized), we may react a xylenol mixture and formaldehyde in the presence of the fatty oil as follows:

|  | Parts |
| --- | --- |
| Xylenol mixture | 27.2 |
| Formaldehyde solution (37%) | 10.6 |
| China-wood oil | 24.3 |
| Spirit soda solution (3.8% solution of sodium hydroxide in methyl alcohol) | 7.6 |
| Butyl acetate | 30.3 |
|  | 100.0 |

The above ingredients and solvents are stirred together and the solution refluxed at atmospheric pressure for 7½ hrs. The flask is then fitted with a downward condenser and the solution heated to 120° C. for 1 hr. The residue is diluted with a mixture of equal parts of methyl alcohol and butyl acetate to a non-volatile content of 60%. Vinylacetylene can be polymerized in the presence of the above product as follows:

*Example 8*

One part of the above solution of oil-modified xylenol-formaldehyde resin, four parts of vinylacetylene, and four parts of xylol are heated together in a closed vessel at 125–130° C. for 7 hours, in an atmosphere of nitrogen. The solution so obtained is evaporated under diminished pressure to a non-volatile content of approximately 50%. A film flowed from this solution was clear, homogeneous and dry to the touch after 2 hours.

We contemplate within the scope of this invention, those products which may be obtained by the polymerization of vinylacetylene in the presence of cellulosic derivatives such as cellulose ethers, e. g., ethyl cellulose, benzyl cellulose and crotyl cellulose, esters of cellulose with organic acids, e. g., cellulose acetate, cellulose butyrate, and cellulose acetopropionate. By way of example as to the operating conditions to be used when vinylacetylene is polymerized in the presence of cellulosic materials, vinylacetylene and ethyl cellulose, on heating for 14 hours at 125–130° C. in benzene solution, formed a homogeneous product which in turn yielded a homogeneous film.

The vinylacetylene used in the above examples was substantially pure, i. e. substantially free from higher polymers of acetylene. The method of forming this vinylacetylene is not a part of the present invention and the vinylacetylene may be obtained in any suitable way, for example, by fractionating the acetylene polymer composition contained under either the Nieuwland process or the Calcott and Downing process, both of which have been referred to above.

In general the vinylacetylene used in our experiments was prepared by polymerizing acetylene in the presence of a cuprous chloride-ammonium chloride aqueous solution, at temperatures slightly above room temperature, separating the vinylacetylene from the mixture of hydrocarbons so obtained, by distillation, and collecting that fraction boiling from 6–10° C.

In the preferred form of the invention, the interpolymerization of the vinylacetylene and other substances has been carried out in the presence of aromatic hydrocarbons or other inert solvent, and in an atmosphere of nitrogen or other inert gas. The solvent prevents gelation and provides a diluent for the unstable vinylacetylene; the inert gas tends to produce a lighter colored and more stable product. As has already been stated, good results could be obtained without the use of a solvent. The selection of a suitable solvent, where a solvent is used, depends upon the nature of the material with which the vinylacetylene is polymerized. Consideration should be given to solvent action, and to chemical action under the particular experimental conditions. For example, in the case of drying oils, aromatic hydrocarbons or aliphatic-aromatic hydrocarbon mixtures are preferable. Reactive solvents such as acids, alcohols and esters are in general not suitable where polyhydric alcohol-polybasic acid resins are used, aromatic hydrocarbons being satisfactory for this type of resin. Where natural resins (or their esters) are combined with fatty oils, appreciable amounts of aliphatic hydrocarbons can be used. Ketones are probably the most generally satisfactory solvent, neglecting economic considerations. Ethyl benzene was used as the solvent with styrene because these two hydrocarbons are commonly associated. Ketones and alcohols, sometimes mixtures of these compounds with esters, are usually satisfactory with phenol-formaldehyde resins. The amount of solvent used may vary within wide limits, but it is more desirable to use larger quantities at higher reaction temperatures.

Altho it is preferable to use an inert atmosphere, such as nitrogen, carbon dioxide, and the like, good results have been obtained in the presence of air. When an inert gas is used, the interpolymers appear to be slightly more stable when stored and are sometimes lighter in color.

The magnitude of the temperature used during the reaction is not critical. The low temperatures, such as room temperature, are in general not suitable because polymerization proceeds too slowly. High temperatures are generally undesirable because of the hazardous nature of vinylacetylene. The preferred temperature range is 125°–130° C., but any temperature at which polymerization occurs without appreciable decomposition may be employed. The selection of a suitable reaction temperature can easily be effected by reference to the nature of the reacting material, the nature and amount of solvent, and can be determined by simple experiment.

Reaction time preferably ranges from about 7–15 hours, the optimum period depending to a large extent upon the proportions in the mixture, the concentration in the solvent, whether or not a solvent is used, and the nature of the material with which the vinylacetylene is to be interpolymerized. When the reaction is completed, the container is cooled and opened. If desired, the volatile material can be removed by heating to 100° C. under diminished pressure. The amount of non-volatile residue is an index to the extent of the polymerization.

The proportions given in the above examples are proportions by weight.

Instead of the static method disclosed in each of the above examples, we may employ continuous processes, such as passing a mixture of vinylacetylene and the other material or solutions thereof, with or without an inert gas, thru a reaction chamber at various temperatures and pressures, removing solvent and unchanged vinylacetylene, mixing the same with a fresh supply of oil, gum, etc. and passing again thru the reaction vessel. We may also pass the vinylacetylene with or without solvent and/or inert gas, thru, into, or over the material in the presence of which it is to be polymerized, or a solution thereof, at various temperatures and pressures, removing unchanged vinylacetylene (and solvent) and passing again thru the reaction chamber.

We may, if desired, use polymerization catalysts for accelerating the reaction, for example, benzoyl peroxide, hydrogen peroxide, manganese dioxide, other metallic oxides, and sometimes certain metallic chlorides, as antimonic and stannic chlorides.

Our products find use in the protective coating field, as varnishes, lacquers, and enamels. They may be used either alone or combined by mutual solvents, heating, or other means with one or more other film-forming materials (which may be additional quantities of the same or related materials with which the vinyl acetylene has been interpolymerized), such as: (1) cellulose derivatives, such as nitrocellulose, benzyl cellulose, ethyl cellulose, and cellulose acetate; (2) natural resins, such as rosin, Congo, and Damar; (3) esters of natural gums, such as ester gum and Congo glycolide; (4) drying oils, such as linseed and China-wood oils; (5) synthetic resins, such as phenol-aldehyde, polyhydric alcohol-polybasic acid, and vinyl; (6) bitumens, such as asphalt. To our products, either alone or mixed with the above substances, we may add driers, fillers, pigments, plasticizers, solvents, antioxidants, etc., as needed and desired. We may use any of the known methods of applying the finish, such as spraying, brushing, air-drying baking, etc.

Other possible uses for our products are coating or impregnating agents for paper, cloth, rubber-coated fabrics, wood pulp, porous stone, etc.; binders, cements, and the like for general use and for holding together sheets of glass, cellulose acetate, mica, etc.; dispersing agents; and molding plastics.

It is believed that the products obtained in accordance with the present invention result from an interpolymerization of monovinylacetylene with the modifying materials present during the reaction, since a separation cannot be obtained in appreciable quantities by extraction or other means. We do not wish to be limited to this theory, however, since the novel products undoubtedly differ in their properties from those combinations of vinylacetylene polymer with modifying materials which are produced by mechanical blending, by simple heating, or by other similar means, and since the novel products of the present invention are far better than the mechanical combinations of the components with respect to the homogeneity of the film.

It is desired to exclude from the scope of the invention the polymerization of vinylacetylene in the presence of substantial amounts of other nonbenzenoid polymers of acetylene. The claims are intended to be construed with the same limitation.

The above description and examples are illustrative only and do not intend to limit the scope of the invention. Any modification or variation therefrom which conforms to the spirit of the invention is intended to be included within the scope of the claims.

We claim:

1. A new composition of matter obtained by polymerizing substantially pure vinylacetylene in the presence of a natural drying oil.

2. A new composition of matter obtained by polymerizing substantially pure vinylacetylene in the presence of a drying oil modified alkyd resin.

3. The process which comprises polymerizing substantially pure vinylacetylene in the presence of a natural drying oil.

4. The process which comprises polymerizing substantially pure vinylacetylene in the presence of a drying oil modified alkyd resin.

5. A product prepared by heating substantially pure vinylacetylene in the presence of a non-acetylenic film-forming material of the group consisting of resins, cellulose derivatives, and polymerizable materials containing at least 2 carbon atoms in an open-chain joined by more than one bond.

6. A product as described in claim 5, characterized in that the reaction is carried out at a temperature at which polymerization occurs without appreciable decomposition and in the presence of a solvent for the materials.

7. A product as described in claim 5, characterized in that the reaction is carried out at a temperature at which polymerization occurs without appreciable decomposition and in an inert atmosphere.

8. A product as described in claim 5, characterized in that the reaction is carried out at a temperature at which polymerization occurs without appreciable decomposition in an atmosphere of nitrogen and in the presence of a solvent for the materials.

9. A product as described in claim 5, characterized in that the reaction is carried out at a temperature at which polymerization occurs without appreciable decomposition in an inert atmosphere and in the presence of an aromatic hydrocarbon solvent for the materials.

10. A product as described in claim 5, characterized in that the reaction is carried out at a temperature at which polymerization occurs without appreciable decomposition in an inert atmosphere and in the presence of a solvent for the materials, said solvent containing a ketone group.

11. An inter-polymer prepared by heating substantially pure vinylacetylene in the presence of a non-acetylenic film-forming material of the group consisting of resins, cellulose derivatives, and polymerizable materials containing at least 2 carbon atoms in an open-chain joined by more than one bond.

12. A product prepared by heating substantially pure vinylacetylene at a temperature of 125 to 130° C. in the presence of a drying oil and in the presence of a mutual solvent for the drying oil and vinylacetylene.

13. A product prepared by heating substantially pure vinylacetylene at a temperature of 125 to 130° C. in the presence of a natural resin and in the presence of a mutual solvent for the vinylacetylene and the natural resin.

14. A product prepared by heating substantially pure vinylacetylene at a temperature of 125 to 130° C. in the presence of a synthetic resin and in the presence of a mutual solvent for the vinylacetylene and the synthetic resin.

15. A product prepared by heating substantially pure vinylacetylene at a temperature of 125 to 130° C. in the presence of an alkyd resin and in the presence of a mutual solvent for the vinylacetylene and the alkyd resin.

16. A product prepared by heating substantially pure vinylacetylene at a temperature of 125 to 130° C. in the presence of a resinous mixed ester of a polyhydric alcohol, a polycarboxylic acid and at least one monofunctional esterifiable organic compound and in the presence of a mutual solvent for the vinylacetylene and the modified alkyd resin.

17. A product prepared by heating substantially pure vincylacetylene at a temperature of 125 to 130° C. in the presence of a drying oil modified alkyd resin and in the presence of a mutual solvent for the vinylacetylene and the modified alkyd resin.

18. A product prepared by heating substantially pure vinylacetylene at a temperature at which polymerization occurs without appreciable decomposition in the presence of a non-acetylenic film-forming material of the group consisting of resins, cellulose derivatives, and polymerizable materials containing at least 2 carbon atoms in an open-chain joined by more than one bond and in the presence of a solvent for the materials and thereafter removing the solvent.

19. A product prepared by heating substantially pure vinylacetylene at a temperature at which polymerization occurs without appreciable decomposition in the presence of a non-acetylenic film-forming material of the group consisting of resins, cellulose derivatives, and polymerizable materials containing at least 2 carbon atoms in an open-chain joined by more than one bond and in the presence of a solvent for the materials and then adding to the solution so formed another film-forming material.

20. The process which comprises heating substantially pure vinylacetylene in the presence of a non-acetylenic film-forming material of the group consisting of resins, cellulose derivatives, and polymerizable materials containing at least 2 carbon atoms in an open-chain joined by more than one bond.

21. The process of claim 20 characterized in that it is carried out at a temperature at which polymerization occurs without appreciable decomposition and in the presence of a solvent for the materials.

22. The process of claim 20 characterized in that it is carried out at a temperature at which polymerization occurs without appreciable decomposition in an inert atmosphere and in the presence of a solvent for the materials.

23. The process of claim 20 characterized in that it is carried out at a temperature at which polymerization occurs without appreciable decomposition in an atmosphere of nitrogen and in the presence of an aromatic hydrocarbon solvent for the materials.

24. The process of claim 20 characterized in that it is carried out at a temperature at which polymerization occurs without appreciable decomposition in an atmosphere of nitrogen and in the presence of a solvent for the materials, said solvent containing a ketone group.

25. The process which comprises heating substantially pure vinylacetylene at a temperature of 125 to 130° C. in the presence of a drying oil and in the presence of a mutual solvent for the drying oil and vinylacetylene.

26. The process which comprises heating substantially pure vinylacetylene at a temperature at which polymerization occurs without appreciable decomposition in the presence of a non-acetylenic film-forming material of the group consisting of resins, cellulose derivatives, and polymerizable materials containing at least 2 carbon atoms in an open-chain joined by more than one bond and in the presence of a solvent for the materials and thereafter removing the solvent.

27. The process of claim 20 characterized in that the vinylacetylene is continuously passed into the treatment zone and that the resulting products, including the unchanged vinylacetylene, are continuously removed therefrom.

28. A product prepared by heating substantially pure vinylacetylene at a temperature of about 125–130° C. in the presence of a natural drying oil and an inert solvent for the materials and in an inert atmosphere.

29. A product prepared by polymerizing substantially pure vinylacetylene in the presence of China-wood oil and toluene at a temperature of 125–130° C. and in an atmosphere of nitrogen.

WALTER E. LAWSON.
JAMES A. ARVIN.